June 10, 1969  G. RAUGLAS  3,448,836
TWO WAY AUTOMATIC BRAKE ADJUSTER
Filed April 5, 1967  Sheet 1 of 4
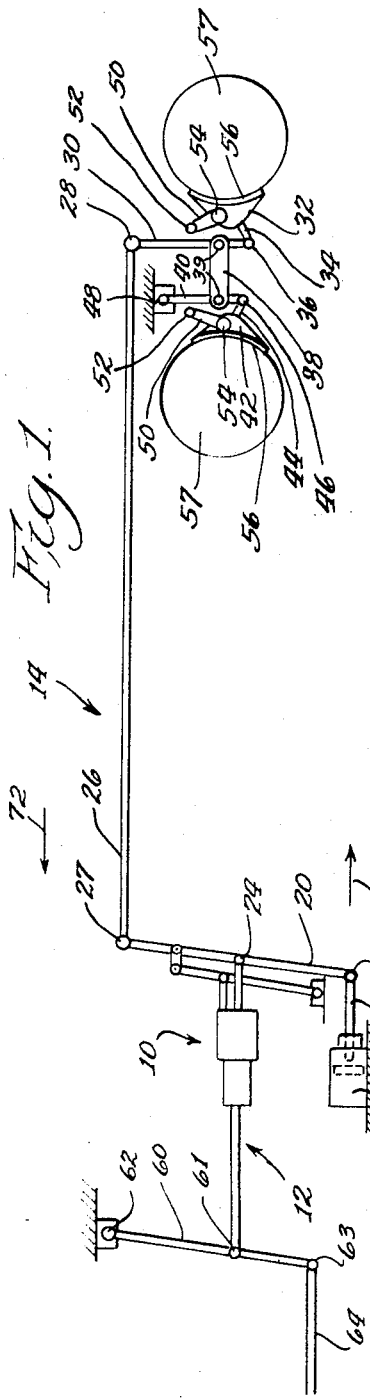
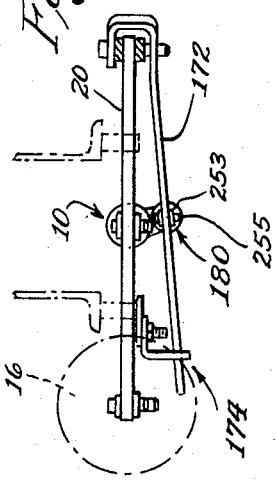
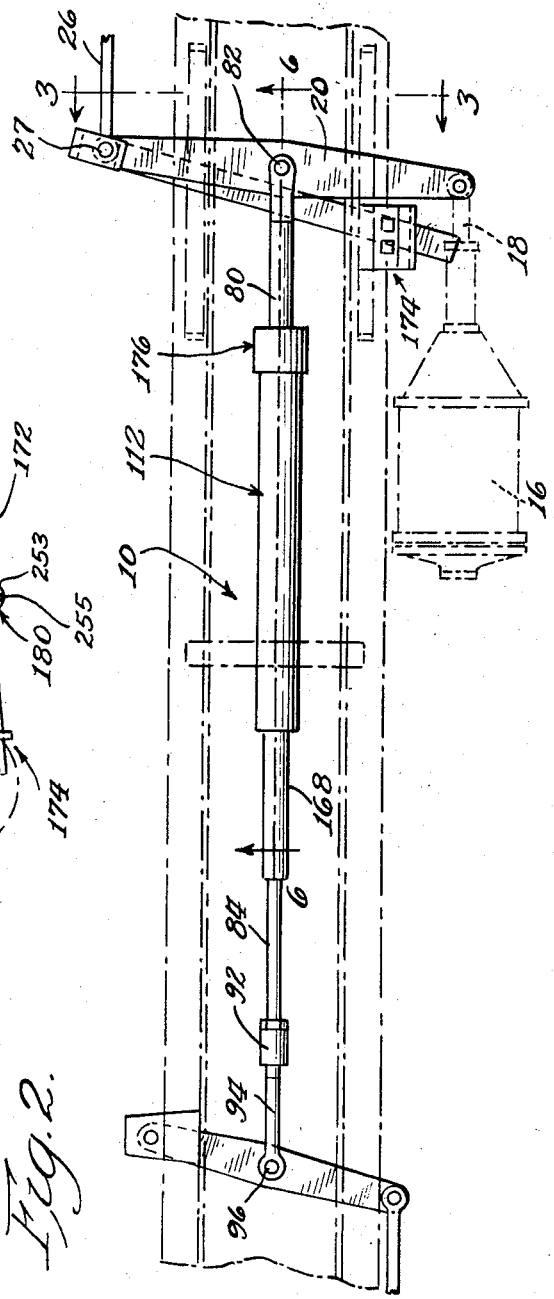
Inventor
Gerard Rauglas
By Mann, Brown & McWilliams
Attys.

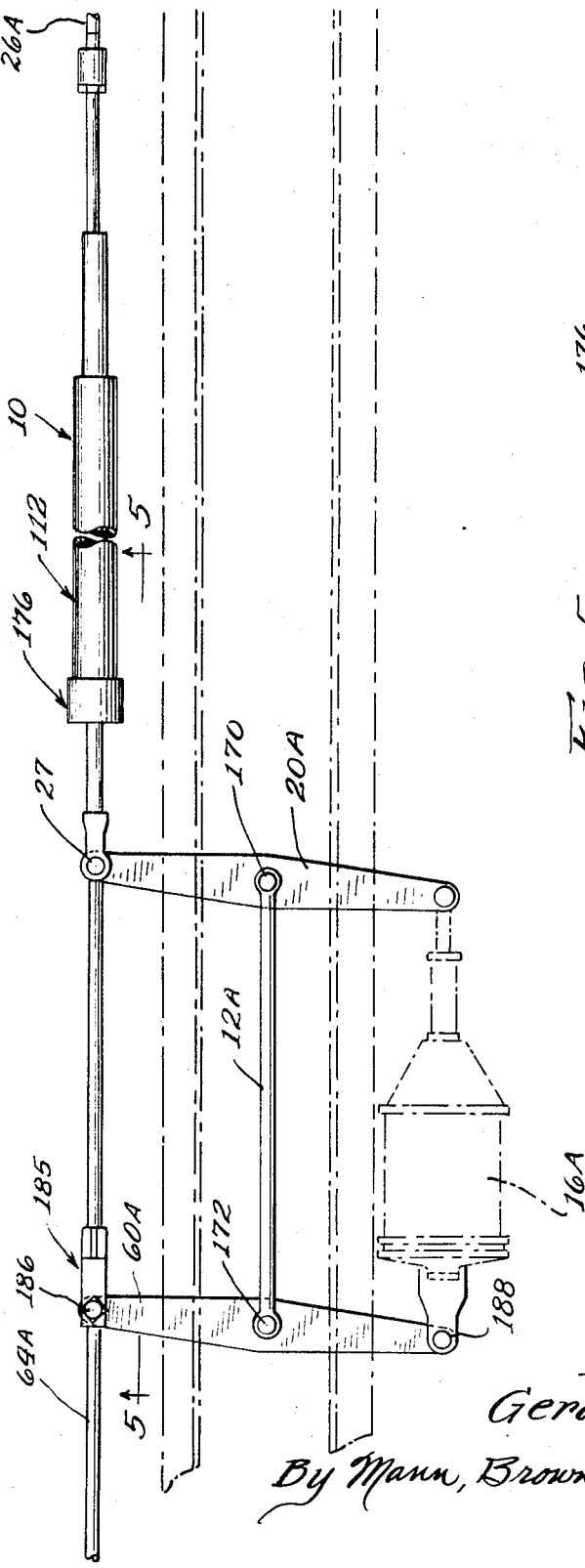
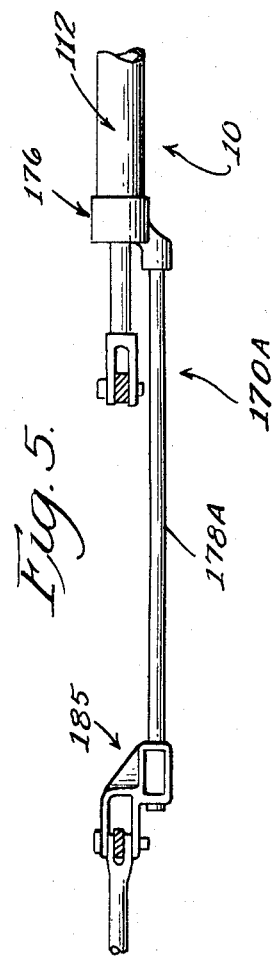

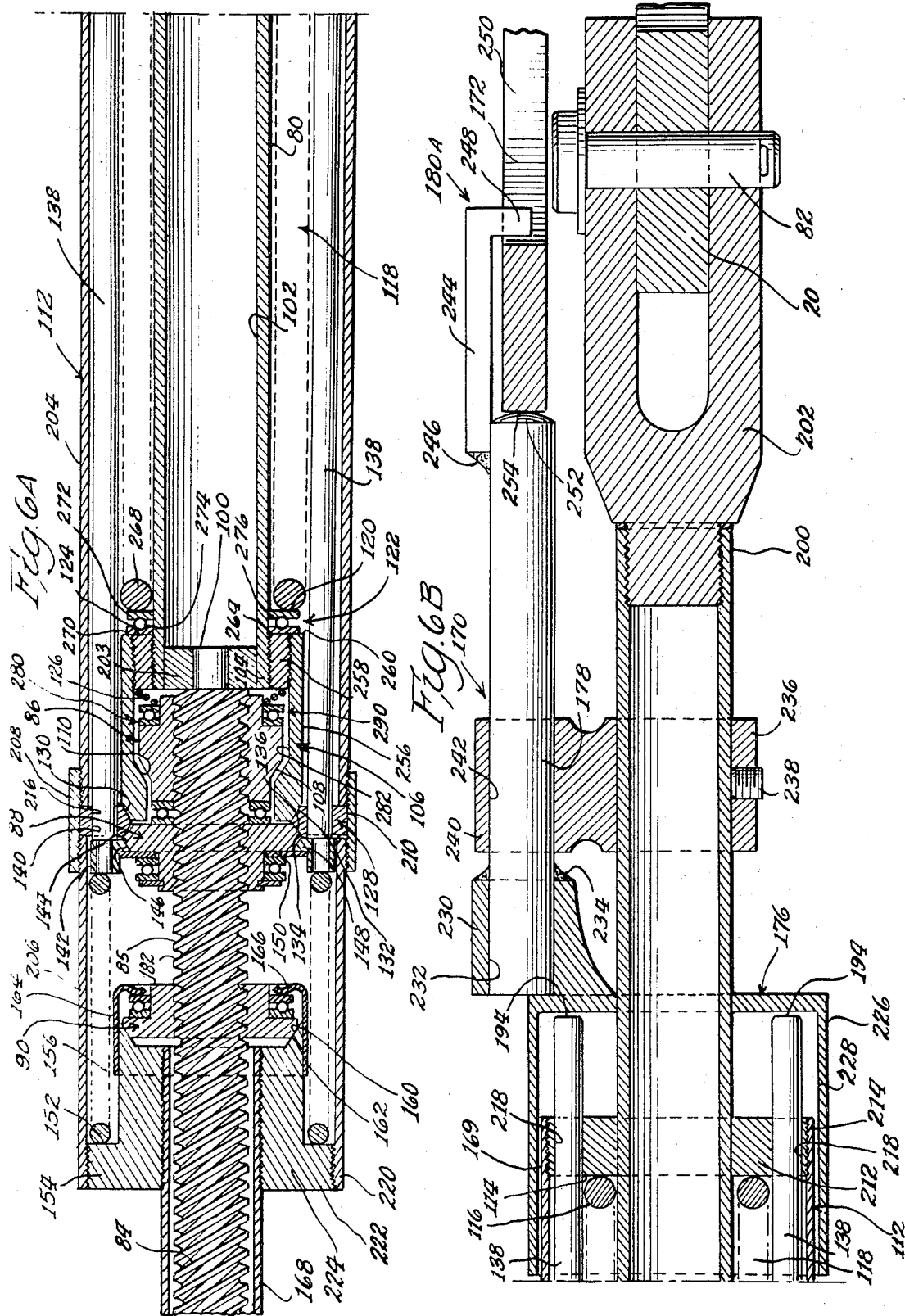

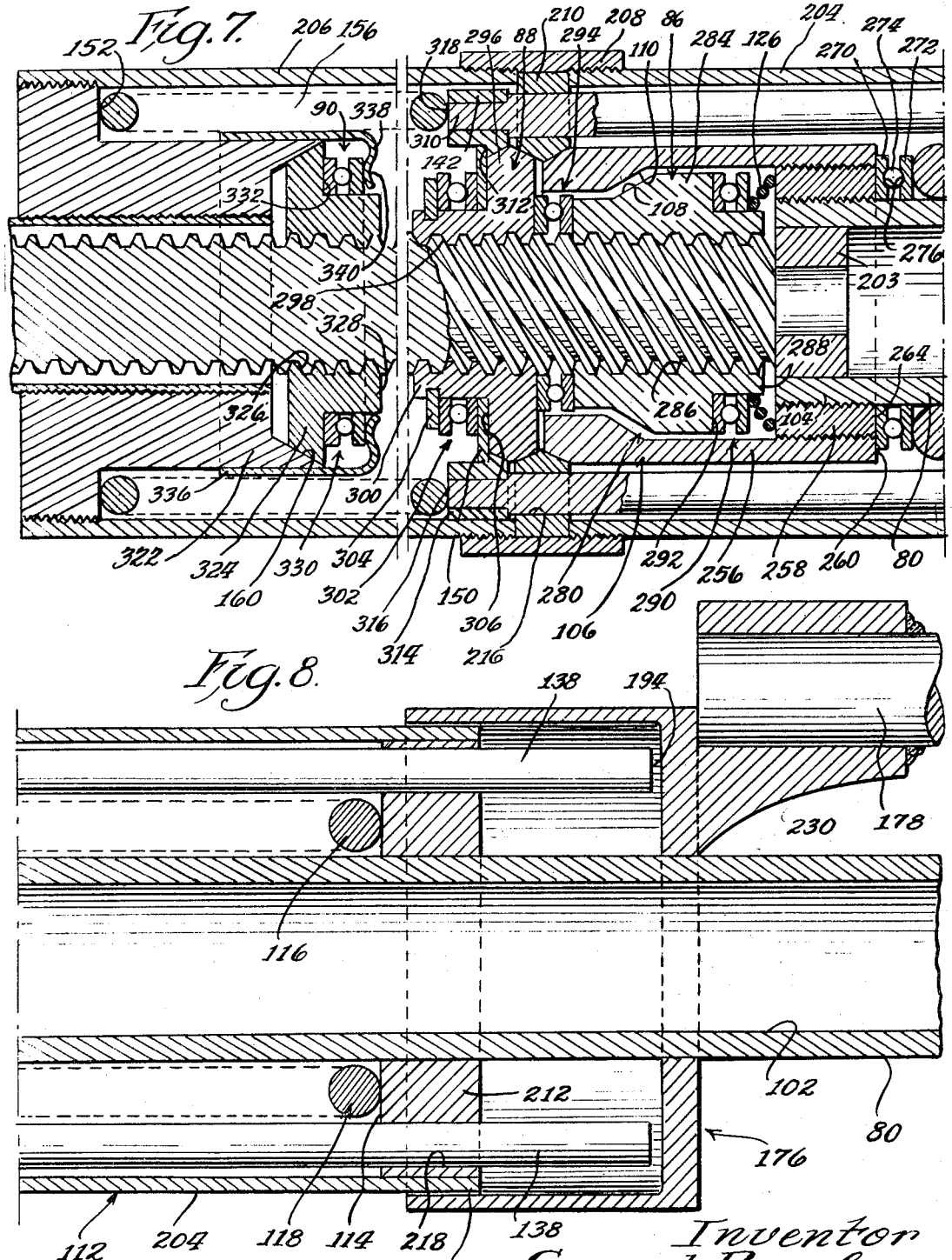

_United States Patent Office_

3,448,836
Patented June 10, 1969

1

3,448,836
TWO WAY AUTOMATIC BRAKE ADJUSTER
Gerard Rauglas, Aroma Park, Ill., assignor to Cardwell Westinghouse Company, a corporation of Delaware
Filed Apr. 5, 1967, Ser. No. 628,711
Int. Cl. F16d 65/56, 65/38
U.S. Cl. 188—202                                    9 Claims

ABSTRACT OF THE DISCLOSURE

This invention relates to a railroad car rigging brake adjusters that is automatic for both slack take up and let out. The adjuster is shown in both center rod and top rod applications, and comprises a screw member having one end portion thereof received in one end portion of a tubular member, with the other ends of the said members being incorporated in the brake rigging in a conventional manner. The screw members carries a coupling nut that is received within a chamber formed at the end of the said one end portion of the tubular member that engages a stop clutch seat that forms a part of the tubular member chamber during the course of the brake rigging bar stroke, whereby the braking stresses are transmitted between the two members. Also carried by the screw member are a pair of adjusting nuts, and a housing surrounding the nuts at the adjacent portion of said members, with the adjuster main spring acting between the housing and the tubular member to tend to draw the housing over the tubular member. The housing is formed with a stop clutch assembly including spaced stop clutch seats cooperating with the adjusting nut that is adjacent the coupling nut to preclude rotational movement in either direction of such adjusting nut, with one of the stop clutch seats being movable toward the second adjusting nut through rods that are actuated by the brake rigging trigger lever during application of the brakes, with the movable stop seat being connected to the first adjusting nut to carry same in the direction urged by the trigger lever, and with a relatively weak spring acting between the housing and the movable seat to restore the movable seat back to its initial position with respect to the housing and at the same time moving the screw member in a slack take up direction with respect to the tubular member due to its clutching action on the first adjusting nut and the bias of the relatively weak spring. The housing also includes a stop clutch seat engaging the second adjusting nut to prevent rotational movement of same when the housing is moving in the direction of the tubular member, and a resilient connection between the housing and the second adjusting nut to move the latter lengthwise of the screw member when the housing is moved under the action of the rigging trigger lever in extreme situations as where several brake shoes have been lost. The housing also includes a stop arrangement for locking out the biasing effect of the main spring against the tubular member, which is only overcome in the extreme type of situation mentioned where the strength of the main spring is required to insure the amount of slack take up required to maintain the brake cylinder stroke length that is required by AAR regulations. Otherwise, during normal operation the rigging operating or trigger lever operates only against the relatively weak spring to insure minimum power loss while providing slack take up in proportion to brake shoe wear.

Railroad car brake rigging slack adjusters are subjected to much shock and vibration during car operation, and it has been found that there is a considerable tendencey for the adjuster to be shaken out of its proper adjustment in relation to actual brake shoe wear so that when the

2 brakes are next applied the rigging either has too little or too much slack for proper brake application.

This is particularly true in the case of adjusters of the screw and nut type since the nuts are ordinarily threaded on non-locking threads for ready rotation after release from stop clutch seats. The jarring and jiggling applied to the adjuster by end of car impacts and the vibrations caused by rough or uneven trackage has been found adequate in many instances to free the nut from its seat and result in sufficient rotation of the nut to throw the adjuster well out of adjustment, with the result that the brake cylinder sroke involves too much either over-travel or under-travel for good brake application.

A principal object of this invention is to provide a brake adjuster of the screw and nut type which positively locks the adjuster against any adjusting movement that might tend to occur as a result of vibration, longitudinal shock due to end of car impacts, and the like.

Another principal object of the invention is to provide for slack take up in adjusters of the screw and nut type where the spring means operates on the adjuster parts through nuts that are locked against rotation, rather than through a screw threading action and its inherent inefficiency due to friction loss.

Further objects of the invention are to provide a brake adjuster that is fully automatic for both slack take up and let out, to provide an adjuster that protects the rigging operating or trigger lever for center rod applications in the event that the rigging hand brake is applied when the brakes have already been set under emergency air conditions (when the car is separated from the train) and to provide a brake adjuster that is economical of manufacture, convenient to install, and readily adapted for application to conventional brake rigging arrangements.

Other objects, uses, and advantages will be obvious or become apparent from a consideration of the following detailed description and the application drawings in which like reference numerals are employed to designate like parts throughout the several views.

In the drawings:

FIGURE 1 is a diagrammatic view illustrating a typical brake riggging arrangement to which the brake adjuster of this application is directly applicable, with the adjuster application being of the center rod type;

FIGURE 2 is a more specific view of the center rod portion of the brake rigging of FIGURE 1 showing in plan the adjuster of this invention applied thereto;

FIGURE 3 is a diagrammatic cross-sectional view substantially along line 3—3 of FIGURE 2;

FIGURE 4 is a view similar to that of FIGURE 2, but showing a top rod application of the adjuster of FIGURES 1–3;

FIGUE 5 is a side elevational view of the adjuster application shown in FIGURE 4 taken substantially along line 5—5 of FIGURE 4;

FIGURE 6A and 6B when taken together comprise a a composite longitudinal sectional view through the adjuster as it would appear along line 6—6 of FIGURE 2, with the adjuster shown arranged for application to a slightly different center rod type trigger lever arrangement;

FIGURE 7 is an enlarged fragmental cross-sectional view illustrating the coupling and adjusting nuts and associated structures that are shown in FIGURE 6A; and FIGURE 8 is a view similar to that of FIGURE 7 but illustrating a portion of the trigger mechanism shown in FIGURE 6B.

However, it is to be distinctly understood that the specific drawing illustrations provided are supplied primarily to comply with the requirements of the Patent Code and that the inveniton is susceptible of other embodiments as will be obvious to those skilled in the art.

GENERAL DESCRIPTION

Referring now to FIGURE 1, reference numeral 10 generally indicates a diagrammatically illustrated embodiment of this invention incorporated in the center rod structure 12 of a conventional brake rigging arrangement generally indicated by reference number 14. A specific embodiment of the adjuster 10 is shown in FIGURES 6A–8, while the showing of FIGURES 1–3 shows a center rod application of the adjuster, and FIGURES 4 and 5 illustrate a top rod application of the adjuster.

As is well known in the art, the brake rigging 14 customarily includes an air actuated brake cylinder 16 that is secured to the car in any suitable manner and includes a thrust or piston rod 18 that is pivotally connected as at 19 to a cylinder or live lever 20 which is in turn pivotally connected to the center rod structure 12 as at 24 and a connecting rod 26 as at 27 that extends to one of the car trucks where the rod 26 may be pivotally connected as at 28 to the actuating truck lever 30 that operates one of the brake beams 32 through a link 34 that is pivotally connected to truck dead lever 40 by link 38 and pivotal joints 39, and lever 40 is connected to the other brake beam 42 by a link 44 (the link 44 being pivotally connected to the lever 40 by pivotal joint 46) and with the lever 40 being pivotally connected to the car truck structure as at 48.

The brake beams 32 and 42 are customarily suspended from the truck by conventional hanger members 50 which are pivoted to the truck as at 52 and to the brake beam as at 54, respectively, and, of course, the brake beams each carry the diagrammatically illustrated brake shoes 56 which are to bear against the diagrammatically illustrated truck wheels 57 for braking purposes.

The center rod structure 12 is also pivotally connected as at 61 to a dead lever 60 which is fulcrumed in any suitable manner to the car structure as at 62 and which is pivotally connected as at 63 to connecting rod 64 that is in turn operatively connected with the truck brake apparatus of the other car truck in a manner similar to that shown at the right hand side of FIGURE 1.

As is well known in the art, when the braking of the car is to be effected, the brake cylinder 16 is actuated to move its thrust rod or piston rod 18 to the right of FIGURE 1 or in the direction of the arrow 70, which tends to throw the cylinder lever counterclockwise about the pivotal connection 24 between it and the center rod structure 12. Likewise this motion tends to move the connecting rod 26 to the left of FIGURE 1 in the direction of the arrow 72 to swing the truck lever 30 in a manner to force brake shoes 56 against the diagrammatically illustrated truck wheels 57. The brakes are in effect released when the air is released from the cylinder 16 in a conventional manner due to the fact that the weight of the brake beams 32 tends to swing them away from the respective wheels 57 about the pivotal hanger mountings 52, which thus causes the connecting rod 26, cylinder lever 20 and the thrust or piston rod 18 to move in directions opposite to those indicated by the arrows 70 and 72.

Of course, the connection of the center rod structure 12 with dead lever 60 operates the lever 60, connecting rod 64 and the truck braking apparatus the latter is connected with in a manner that is similar to that mentioned with regard to the truck brake apparatus shown in FIGURE 1.

AAR regulations require that the brake power stroke of cylinder 16 be between 7 and 9 inches, although brake cylinders are customarily proportioned and applied to the car to accommodate a stroke as high as 12 inches to accommodate extreme conditions. New cars when their brake rigging is applied and properly adjusted should provide a brake cylinder stroke of 7 inches, assuming that the car trucks have new brake shoes applied thereto.

As is well known in the art, brake shoes tend to wear away during each application of the car brakes and while the brake shoe attrition is not materially noticeable for each braking operation, it is cumlative and causes an increase in the amount of slack created in the rigging as day to day use of the car proceeds. The result is that each time the car brakes are to be applied, the brake levers must be moved just a little further toward the respective wheels of the truck each time, which means that a slightly increased movement of connecting rods 26 and 64, and the thrust or piston rod 18 (assuming no brake adjuster) is required for each time the brakes are applied. AAR regulations further require that when brake wear has proceeded to the point that the brake cylinder stroke has "over travel" of one inch over the basic brake cylinder stroke of seven inches, there must be sufficient take up in the rigging to restore the brake cylinder to approximately its original seven inch stroke.

The general function served by the brake adjuster 10 is to consistently maintain the stroke of the brake cylinder at the prescribed seven inches and to automatically accommodate or effect the brake rigging slack take up and let out that is involved in providing such results.

As indicated in FIGURES 2, 6A and 6B, the adjuster 10 generally comprises an elongate tubular member 80 pivotally connected to the cylinder or live lever 20 by suitable pin 82 which forms the pivotal connection 24. The tubular member 80 receives a rod member 84 that has one end 85 thereof suitably threaded for cooperation with a coupling nut 86, a first adjusting nut 88 and a second adjusting nut 90. The other end of the rod 84 is secured to a suitable fitting 92 which is in turn suitably secured to an extension rod 94 that is in turn pivoted to the dead lever 60 by pin 96 which forms the pivotal connection 61.

The terminal end portion 100 of rod 84 is received within the bore 102 of tubular member 80 and the tubular member 80 at its end 104 carries a housing 106 in which the coupling nut 86 is mounted, with the coupling nut 86 being provided with a stop clutch surface 108 that cooperates with stop clutch surface 110 of housing 106.

Received about the end 104 of the tubular member 80, the end 85 of rod member 84, and the nuts 86, 88 and 90, is a tubular housing 112 formed with a spring seat 114 at one end thereof against which is applied one end 116 of a high strength main spring 118 with the other end 119 of the spring 118 being applied against a spring seat 120 which in the embodiment shown is in the form of ball bearing unit 122 that is seated against the shoulder 124 of tubular member 80 which is defined by housing 106 thereof.

Compression spring 126 is applied between the coupling nut and tubular member 80 to bias the coupling nut 82 in the direction of the stop clutch seat 110 of housing 106.

The tubular housing 112 is formed with a stop structure 128 including abutment surface 130 on one side thereof that engages against the abutment surface 132 of the tubular member housing 106 under the biasing action of main spring 118.

The stop structure 128 also includes a stop clutch seat or surface 134 on the other side thereof that engages a correspondingly contoured stop clutch seat or surface 136 of adjusting nut 88.

Slidably mounted in the tubular housing 12 are a plurality of actuator or slide rods 138 which slidably extend through openings 140 of the stop structure 128 and are secured to an annular ring member 142 that is formed with a stop clutch surface or seat 144 which cooperates with a similarly contoured stop clutch surface 146 of nut 88. Ring 142 includes an extension 148 that engages an annular disc 150 that is keyed to the nut 88, when ring 142 is moved to the left of FIGURE 6A.

Interposed between the housing spring seat 152 at housing end 154 and the ring 142 is a comparatively weak compression spring 156 that biases the rods 138 to the right of FIGURES 6A and 6B and biases the stop clutch seat 144 of ring 142 into engagement with the seat 146 of nut 88, which in turn biases the seat 150 of the nut 188 against the stop clutch seat 134 of stop structure or ring 128 that is stationary with respect to housing 112.

The tubular housing 112 is formed with a stop clutch seat 160 that cooperates with the stop clutch seat 162 of adjusting nut 90, and annular spring element 164 fixed to the housing 112 in any suitable manner includes a flange portion 166 that engages the nut 90 to move same to the left of FIGURE 6A on movement of the housing 112 in the same direction.

The housing 112 carries a suitable annular shield member 168 which covers the threaded portion of rod member 84 in all possible operating positions of the housing 112.

The rod members 138 projects outwardly of end 169 of housing 112 and are actuated by a thrust or trigger device 170 under the control of trigger lever 172 that is connected between the cylinder lever 20 and pivotal connection 27 and a bracket structure 174 (see FIGURES 2 and 3) of the general type disclosed in my Patent No. 3,177,985, granted Apr. 13, 1965 (the disclosure of which is incorporated herein by this reference).

The thrust or trigger device 170 in the form shown comprises a disc member 176 slidably mounted on tubular member 80 and carrying a connecting rod 178 that is suitably coupled as at 180 (FIGURE 3) or 180A (FIGURE 6B) to the operating or trigger lever 172.

The operating or trigger lever 172 by virtue of its pivotal connection with the car structure at the bracket 174 and its relation to the rest of the brake rigging 14 introduces a differential motion into the operation of the trigger device 170 that controls the slack take up and let out operations of the adjuster during the operation of the brake rigging.

In the top rod application of FIGURES 4 and 5, the adjuster 10 forms a part of the connecting rod corresponding to rod 26 and is connected between the pivotal connection 27 and a shortened connecting rod 26A. The trigger mechanism 170A for controlling the adjuster 10 of FIGURES 4 and 5 is in the form of a connecting rod 178A that extends between disc member 176 and a clevis structure 185 that is pivotally connected to dead lever 60A, as by pin 186, which lever 60A is in turn connected to connecting rod 64A that extends to a truck braking arrangement of the general type shown in FIGURE 1. The dead lever 60A in the top rod application shown is fulcrumed as at 188 to one end of the brake cylinder 16A and the center rod 12A is pivotally connected between the cylinder lever 20A and the dead lever 60A as by appropriate pivotal connections 190 and 192.

The adjuster 10 in both the center rod and top rod applications operates in a similar manner which will now be described in connection with the center rod application.

OPERATION OF ADJUSTER

FIGURES 6A and 6B show the adjuster in its riding position at a point in its operation when new brake shoes have been applied to the trucks. In this condition the adjuster is in its maximum extended position and spring 156 holds adjusting nut 88 against rotation in either direction through the oppositely acting seats 136 and 146. Nuts 86 and 88 are proportioned so that when nut 88 is in the position of FIGURE 6A, nut 86 is separated from its clutch seat 110 against the action of its spring 126.

Subsequent brake applications effect slack take up in the following manner: On application of the brakes, the brake cylinder 16 through its piston 17 forces thrust rod 18 to the right of FIGURE 1, causing cylinder lever 20 to swing counterclockwise about the pivotal connection 24 between it and the center rod structure 12 and move connecting rod 26 to the left, as already described.

This places the center rod structure 12 under tension and tends to draw tubular member 80 to the right of FIGURES 6A and 6B with respect to the rod member 84 as tension builds up in the rigging.

In the meantime, the movement of the cylinder lever 20 causes a corresponding differential movement of the trigger lever 172 which actuates trigger mechanism 170 to move disc 176 toward and into engagement with thrust rods 138. The adjustment should be such that the disc 176 contacts the ends 194 of the thrust rods 138 when the brake shoes contact the wheels. The brake rigging power stroke proceeds and as the brake shoes are worn away due to the frictional contact with the wheels, the cylinder lever 20 and operating or trigger lever 172 continue their movements to force thrust rods 138 to the left of FIGURES 6A and 6B, which moves ring 142 against the disc 150 of nut 88 and biases the nut 88 to the left of FIGURE 6A distance that is proportional to the amount of the brake shoe wear, ordinarily about a sixteenth of an inch.

On release, air is released from the brake cylinder 16 and tension in the rigging disappears thereby permitting the brake beams 32 and 42 to swing away somewhat from the wheels 57, which tends to bias the cylinder lever 20 and trigger lever 172 back to their initial operating positions.

Simultaneously, the spring 156 acts on ring 142 to bring its stop clutch seat 144 against the stop clutch seat 146 of nut 88 thereby locking the nut 88, 86 against rotation with respect to rod member 84 and permitting the bias of spring 156 to move the rod member 84 in the direction of tubular member 80 and advancing the rod member 84 within the tubular member bore 102 until the stop clutch seat 136 of nut 88 engages the stop clutch seat 134 of stop structure 128. This action shortens the adjuster in proportion to brake shoe wear to insure that the desired stroke length of the brake cylinder is maintained, and at the same time the thrust rods 138 and trigger mechanism 170 are returned to their riding positions under the action of spring 156.

Consecutively following operations of the brake rigging operate in a similar manner to continue to draw the rod member 84 into the bore 102 of the tubular member 80 for slack take up purposes. This is the normal functioning of adjuster 10 for slack take up purposes and it will be noted that no operation of the main spring 118 is involved, and as a matter of fact the biasing action of the spring 118 remains locked out due to the cooperation of the stop structure seat 130 engaging seat 132 of the tubular member housing 106.

In the event that one or more brake shoes are dropped, the differential motion applied to trigger lever 172 will move the thrust rods 138 to the left of FIGURES 6A and 6B to the point where they are completely inserted within the housing 112, and at this point the disc 176 acts against the action of spring 118 to move the housing 112 itself to the left of FIGURES 6A and 6B with respect to tubular member 80. This action separates the stop clutch seat 162 of nut 90 from stop clutch seat 160 of the housing and moves the nut 90 to the left of FIGURE 6A with respect to rod member 84 through the drawing action of spring member 164.

On release, the main spring 118 acting between its spring seats 114 and 120 draws housing 112 to the right of FIGURES 6A and 6B with respect to tubular member 80, which brings stop clutch seat 160 of housing 112 against the stop clutch seat 162 of nut 90 and clutches nut 90 against rotation; the full power of the main spring 118 then is applied to the rod member 84 through nut 90 to advance the rod 84 into the bore 102 of member 84 until the seat 130 of stop structure 128 engages seat 132 of the tubular member housing 106. At this point, the spring 156 performs its above described function to return the parts to their riding positions for the next brake application.

The slack take up functioning of the brake adjuster operates in the manner above described until the brake shoes have been replaced. Replacement of the brake shoes customarily involves the prying of the brake beams away from the car wheels to provide enough working room to fit the shoes in place on the brake beams. The normal slack in the brake rigging plus the flecture provided by the trigger mechanism 170 accommodate the necessary brake beam movement to facilitate this replacement operation.

On the first operation of the brakes after replacement of the brake shoes, the operation of the adjuster 10 effects the extension of the adjuster that is necessary to insure the required seven inch stroke of the brake cylinder. As tension rises in the rigging during the power stroke of the brake cylinder, trigger lever 172 will provide the same differential movement of the trigger mechanism that is described above, but due to the presence of new brake shoes between the brake beams and the wheels, the position of the trigger lever 172 with respect to the adjuster will be such that disc 176 will be well short of rods 138 when the brake shoes contact the wheels 57. As the brake cylinder goes through completion of its power stroke, the tension in the rigging separates the housing 106 of tubular member 80 from the stop structure 128 of housing 112, which permits the bias of main spring 118 acting between housing 112 and shoulder 124 of tubular member 80 to rotate housing 112 and nuts 86, 88 and 90 as a unit to permit rod member 84 to be withdrawn from the bore 102 of tubular member 80 under the tension in the rigging. This action continues until the ends 194 of thrust rods 138 engage trigger mechanism disc 176 at which point the clutch surfaces 130 and 132 of tubular member housing 106 and stop structure 128 respectively engage to stop slack let out.

The result is that the adjuster for the first brake application after application of new shoes insures that the brake cylinder has the desired seven inch stroke.

The adjuster 10 when it is supplied for application to a car ordinarily will be in its fully contracted position in which the rod member 84 will be fully drawn into the tubular member 80.

The adjuster will perform in the manner immediately described above on first application of the brakes to provide the necessary slack let out required.

It will be noted that the action of spring 156 on ring 142 provides a firm holding action on adjusting nut 88 due to the contact of the stop clutch surfaces 136 and 146 of nut 88 with stop clutch surfaces 134 and 144 of stop structure 128 and ring 142 respectively. Since housing 112 is also firmly seated against stop surface 132 of tubular member housing 106, it will be clear that not only nut 88 but nut 90 are firmly held against any adjuster changing rotation in the riding position of the adjuster.

Nut 86 is also held in position by the action of its biasing spring 126 biasing same against nut 88. While nut 86 might be free to rotate under vibration or jar in a direction that would move it to the right of FIGURE 6A with respect to rod member 84 a brief distance, spring 126 would be immediately effective to return the nut 86 back into abutting relation with the nut 88 that is in turn held against rotation in either direction from two sides of the nut.

Furthermore, main spring 118, due to the cooperating action of surfaces 130 and 132 of the stop structure 128 and tubular member housing 106, is effectively locked out of any biasing action on any of the nuts during the riding position of the adjuster and consequently the main spring cannot change the adjustment of the adjuster under any conditions that might occur during the normal riding position of the brake rigging.

Moreover, since the brake cylinder does not have to operate against the power of the main spring except under the very exceptional circumstance where one or more brake shoes have been lost, brake cylinder power loss due to the adjuster is held well within the limits specified by the AAR.

SPECIFIC DESCRIPTION

Tubular member 80 at its end 200 has secured thereto in any suitable manner a clevis 202 that is in turn secured to the cylinder lever 20 or 20A by suitable pin 82 which forms the pivotal connection 24 or 27 (depending on whether the center rod application or the top rod application is employed).

Rod member 84 at its end 100 carries a bronze bearing sleeve 203 secured in place by an appropriate shear pin or the like (not shown). Sleeve 203 should be proportioned to substantially complement the bore 102 of tubular member 80 for appropriate guiding purposes.

The tubular member 112 comprises sleeve members 204 and 206 that are joined together by a coupling member 208, with the sleeve members 204 and 206 being separated by ring 210 that forms stop structure 128. The main spring seat 114 is formed by annular wall 212 fixed to the end 214 of sleeve 204 in any suitable manner as by screw threading.

The thrust rods 138 are slidably mounted in aligned openings 216 and 218 of the ring 210 and end wall 212, respectively, and may be of any suitable number about the circumference of the adjuster to perform the functions described. The rods 138 should be equally spaced about the circumference of the adjuster and four of such rods will be satisfactory for most applications.

The sleeve 206 of housing 112 at its end 220 is secured to the flange 222 of the hub member 224 that is at the end 154 of housing 112. The protecting sleeve 168 is affixed to hub member 224 in any suitable manner as by screw threading.

The disc 176 of trigger mechanism 170 is in the form of a cup shaped member 226 including annular wall 228 that is of sufficient dimension axially of the adjuster to overlie the sleeve 204 of housing 112 in all possible operating positions of the trigger mechanism so as to avoid any interference of foreign matter with the cooperation of the thrust rod ends 194 and the disc 176.

The cup shaped member 226 that forms disc 176 in the form shown is provided with a lug structure 230 formed with an opening 232 which receives, in the form of FIGURES 3 and 6B, the connecting rod 178 that is made fast with respect to the lug structure 230 in any suitable manner as by welding at 234. Received over the tubular member 80 is a collar structure 236 that is slidably received on tubular member 80 for appropriate adjustment with respect thereto, in which position it may be made fast by tightening set screw 238. Collar 236 includes an extension 240 that is bored as at 242 to slidably receive the connecting rod 178 and guide same during operation of the trigger mechanism.

The connecting rod 178 in the form shown in FIGURE 6B is operably secured to the trigger lever 172 by angle shaped bracket 244 that is fixed to the rod 178 as by welding at 246. The right angled end 248 of bracket 244 makes sliding contact with edge surface 250 of the trigger lever 172 while the spherically contoured end 252 of connecting rod 178 makes sliding contact with edge surface 254 of the trigger lever. In the form of FIGURES 2 and 3, rod 178 includes a clevis 253 pivotally connected to trigger lever 172 by pin 255.

The coupling nut housing 106 of tubular member 80 comprises an annular member 256 that is threadedly received on sleeve 258 which in turn is threadedly received on the end 104 of tubular member 80. The spring seat 120 of main spring 118 is formed by bearing unit 122 seated against the transversely aligned end surfaces 260 and 264 of members 256 and 258, respectively that form shoulder 124. Ball bearing unit 122 is interposed between the end 268 of spring 118 and the shoulder 124 to permit the spring to rotate with respect to tubular member 80 on slack let out operation of the adjuster.

The ball bearing unit 122 may be of any suitable type that preferably includes race members 270 and 272 separated by ball members 274 operating in the usual raceway grooves 276. Bearing unit 122 is only diagrammatically illustrated but it should be understood that it will ordinarily be of the type that includes a retaining means to equally space the bearing balls 274 about the bearing and a suitable seal arrangement to protect the balls.

The housing 106 that is formed by member 256 defines a chamber 280 in which the coupling nut 86 is received. The member 256 has its interior wall 282 formed to define the frustoconical stop clutch surface 110 that cooperates with the corresponding frustoconical stop clutch surface 108 of the coupling nut 86.

Nut 86 comprises an annular body 284 that is internally threaded as at 286, for cooperation with the threading 182 of rod member 184, and that is formed with an annular flange 288 on which is received ball bearing unit 290 that is interposed between the compression spring 126 and a shoulder 292 of the nut 86.

Interposed between the coupling nut 86 and adjusting nut 88 is a ball bearing unit 294 that permits the coupling nut 86 to rotate with respect to the adjusting nut 88 when the occasion demands.

The adjusting nut 88 comprises an annular body 296 shaped to define the stop clutch seats 136 and 146 as well as internal threading 298 for cooperation with the threading 182 of rod member 84 and annular flange portion 300 on which ring 150 and ball bearing unit 302 are received, with a suitable locking ring 304 being employed to lock the ball bearing unit 302 and ring 150 against shoulder cylinder 306 of nut 88.

The ring 142 which carries the clutch surface 134 that the clutch seat 146 of nut 88 cooperates with comprises an annular member having the ends 310 of thrust rods 138 affixed thereto in any suitable manner. Ring 142 is formed with a shoulder 312 (see FIGURE 7) which is seated behind ring 150, and as already indicated, the ring 142 is formed to define the stop clutch seat 144. The relation between shoulder 312 of ring 142 and ring 150 that keys same to nut 88 for movement to the left of FIGURE 6A should be such that when ring 142 is moved to the left of FIGURE 6A through rods 138, its seat 144 separates from nut 88 sufficiently to permit nut 88 to readily rotate under the drawing action applied against it.

The transversely aligned end surfaces 314 and 316 of the ring 142 and thrust rod ends 310 form a spring seat 318 for the spring 156, the other end of which seats on spring seat 152 that is formed by the end member 154 of housing 112.

The hub member 224 at its inner end 322 is formed to define the clutch stop seat 160 that cooperates with the seat 162 of nut 90.

Nut 90 comprises an annular body 324 that is internally screw threaded as at 326 to cooperate with the threading 182 of rod member 84 and is formed with a flange portion 328 on which is mounted ball bearing unit 330 that is held against the shoulder 332 of the nut 90 by the action of spring member 164.

Spring member 164 comprises an annular member 336 formed from spring steel or the like and affixed to the hub member 224 in any suitable manner. The annular member 336 has its end portion 338 turned inwardly to define a resilient flange 340 that is seated against the ball bearing unit 330. The flange 340 should have sufficient flexibility so that when spring 156 operates on nut 88 to draw rod member 84 into tubular member 80, the nut surface 162 separates from the stop clutch surface 160 sufficiently to permit the nut 90 to rotate under the drawing action involved and thus displace the nut 90 with respect to the rod member 84 in a slack take up direction; however, flange 340 should apply sufficient bias to nut 90 tending to move it to the left of FIGURE 7 that in the riding position of the adjuster parts nut 90 is held in stop clutching relation to seat 160.

The ball bearing units 290, 294, 302 and 330 should be of the general type described in connection with unit 266.

The adjuster 10 can be readily adapted for application to the two center rod applications shown in FIGURES 1–3 and 6B, respectively or the top rod application shown in FIGURES 4 and 5 as should now be apparent from what has been described. Note that the cup member 226 which forms the disc 176 of trigger mechanism 170 may be readily shifted between the several different positions indicated in these figures with respect to tubular member 80 for receiving the connecting rod 178 or connecting rod 176A as the case may be.

In addition to the advantages already described, this invention provides protection to the trigger lever in center rod applications when the car hand brake is set at a time when the brakes are already set, as is sometimes the practice where a train of cars is moving into a yard for separating purposes and after the engine leaves the train the brakes are set under emergency air conditions. Under such conditions the brake cylinder thrust rod 18 may be pulled out or to the right another two inches over the normally experienced for the usual brake application; the remaining components of the rigging readily accommodate this movement except for the trigger lever which cannot shift at its end that cooperates with bracket 174, which results in the trigger lever being arced to the right of FIGURE 2. The springs 156 and 118 of adjuster 10 consecutively yield under the pressures generated by such conditions thus protecting the trigger lever against bending. Any change that is made in the adjuster length as a result of this action is corrected on the next application of the brakes.

The adjuster of this invention permits the spring 156 to be designed for a maximum spring pressure of 200 to 300 pounds, as compared to the main spring 118 which should provide a minimum load of 440 pounds.

The foregoing description and the drawings are given merely to explain and illustrate my invention and the invention is not to be limited thereto, since those skilled in the art who have my disclosure before them will be able to make modifications and variations therein without departing from the scope of the invention.

I claim:
1. A brake adjuster adapted to form a part of railroad car brake rigging, said adjuster comprising:
    a pair of non-rotatable elongate members having portions thereof disposed in juxtaposed parallel relation,
    a housing received over said juxtaposed portions of said members,
    said portion of one of said elongate members being threaded and said portion of the other of said elongate members being tubular for receiving said portion of said one member,
    coupling nut means carried by said one member on said portion thereof and operably engageable with said other member for transmitting braking forces through the adjuster tending to move said members in a let out direction,
    adjusting nut means carried by said one member on said portion thereof,
    a trigger element mounted for movement longitudinally of said members,
    means for clutching said adjusting nut means against rotation with respect to said one member on movement of said trigger element toward said other member and including a clutch seat clutchably engageable with said adjusting nut means on movement of said clutch seat toward said other member,
    means for moving said clutch seat through said trigger element toward said one member and for rotating said adjusting nut means toward said one member in proportion to brake shoe wear on application of the brakes and in a slack take up direction relative to said one member, and resilient means acting on said clutch seat on release of the brakes clutching said seat against said adjusting nut means for moving said one member, through said adjusting nut means, relative to said other member in a slack take up direction in proportion to said brake shoe wear.

2. The adjuster set forth in claim 1 wherein said resilient means comprises:

a relatively strong spring means acting between said housing and said other member for biasing said housing in the direction of said other member, and a relatively weak spring means acting between said housing and said clutch seat for biasing said one member in the direction of said other member through said adjusting nut means, said trigger element being positioned to engage said housing and move same toward said one member on application of the brakes, and means for locking out the biasing action of said strong spring means until said housing is moved toward said one member a predetermined distance, and including a second adjusting nut means carried by said one member and a clutch seat carried by said housing for clutchably engaging said second adjusting nut means on movement of said housing toward said other member, said relatively strong spring means acting through said housing and its said clutch seat to move said one member relative to said other member in a slack take up direction prior to the locking out of said strong spring means.

3. A two way automatic brake adjuster adapted to form a part of railroad car brake rigging, said adjuster comprising:

a pair of elongate members disposed in juxtaposed parallel relation, one of said members comprising a screw member, a coupling nut threadedly carried by said screw member and mounted for movement longitudinally of the other of said members on relative movement between said members longitudinally thereof, a stop clutch seat carried by said other member and positioned to engage said nut on movement of said members in a slack let out direction, first and second adjusting nuts threadedly carried by said screw member, a housing in circumambient relation about said nuts and the portions of said members adjacent same, said housing carrying a stop clutch assembly cooperating with one of said adjusting nuts including stop clutch seats positioned on either side of said one adjusting nut, one of said housing seats being movable with respect to said housing and including means for coupling said one seat to said one adjusting nut for moving same therewith longitudinally of said screw member, said housing carrying a further stop clutch seat cooperating with said second adjusting nut to preclude rotational movement of same toward said first adjusting nut on movement of said housing in one direction longitudinally of said members, said one housing seat of said first adjusting nut cooperating with said first adjusting nut to preclude rotational movement thereof away from said second adjusting nut on movement of said housing in said one direction longitudinally of said members, first resilient means interposed between said housing and said other member for biasing said members to move in a slack take up direction with respect to each other through said one housing seat engaging said first adjusting nut and said housing further seat engaging said second adjusting nut, second resilient means interposed between said housing and said first adjusting nut one seat for biasing same into stop clutching engagement with said first adjusting nut to hold said first adjusting nut in stop clutching engagement with the other of said seats of said stop clutch assembly, and take up control means for effecting movement of said screw member relative to said other member in a slack take up direction under the action of one of said resilient means, said take up control means including actuator means movable with respect to said members during application of the brakes and including means for moving, during brake application, said housing one seat away from said housing clutch assembly other seat against the biasing action of said second resilient means to advance said first adjusting nut along said screw, whereby on release of said brakes one of said resilient means moves said members in a slack take up direction through said adjusting nuts being clutched against rotation with respect to said screw member.

4. The brake adjuster set forth in claim 3 wherein:

said second resilient means biases said first adjusting nut against said coupling nut in the release position of said adjuster to separate said coupling nut from said other member stop clutch seat, and resilient means acting on said coupling nut for biasing same for movement toward said other member stop clutch seat.

5. The brake adjuster set forth in claim 3 including:

resilient means for biasing said second adjusting nut against said further stop clutch seat.

6. The brake adjuster set forth in claim 3 wherein:

said first adjusting nut housing one seat moving means comprising rod means slidably mounted in said housing and extending longitudinally of said members, and wherein said actuator means further includes a control member mounted on said other member for shifting movement longitudinally thereof and operably engageable with said rod means, and including means for controlling the movement of said control member relative to said screw member and said other member during the power and release strokes of the rigging for effecting said movement of said housing one seat.

7. A two way automatic brake adjuster adapted to form a part of railroad car brake rigging, said adjuster comprising:

a pair of elongate members disposed in juxtaposed parallel relation, one of said members including a screw threaded portion and the other of said members comprising a tubular member in which said threaded portion of said one member is adapted to be received, a coupling nut threadedly carried by said one member threaded portion and mounted for limited movement longitudinally of said tubular member on relative movement between said members longitudinally thereof, said one member threaded portion being mounted in alignment with the bore of said tubular members at one end of said tubular member, said tubular member at said one end thereof defining a chamber in which said coupling nut is received, a stop clutch seat carried by said tubular member at said one end thereof and positioned to engage said nut on movement of said members in a slack let out direction, first and second adjusting nuts threadedly carried by said one member threaded portion exteriorly of said chamber, a housing member in circumambient relation about said nuts and the portions of said members adjacent same, said housing carrying a stop clutch assembly cooperating with said first adjusting nut including opposed stop clutch seats positioned on either side of said first adjusting nut, said first adjusting nut being disposed between said second adjusting nut and said one end of said tubular member, with the one of said housing seats that opposes movement of said first adjusting nut away from said tubular member being movable with respect to said housing and away from said housing other seat and including means for coupling said movable seat to said one adjusting nut for moving same therewith longitudinally of said screw member, said housing carrying a further stop clutch seat cooperating with said second adjusting nut to preclude rotational movement of same away from said tubular member and including means for coupling said housing to said second adjusting nut for moving same therewith away from said tubular member, said movable housing seat of said first adjusting nut cooperating with said first adjusting nut to preclude rotational movement thereof away from said second adjusting nut on movement of said movable seat toward said tubular member, first resilient means interposed between said housing and said tubular member for biasing said member to move in a slack take up direction with respect to each other through said movable housing seat engaging said first adjusting nut and said housing further seat engaging said second adjusting nut, second resilient means interposed between said housing and said first adjusting nut movable seat for biasing same into stop clutch engagement with said first adjusting nut to hold said first adjusting nut in stop clutching engagement with the other of said seats of said stop clutch assembly, stop means carried by said housing and engaging said tubular members under the action of said first resilient means to dispose said housing in a predetermined operating position with respect to said tubular member, and take up control means for effecting movement of said one member relative to said tubular member in a slack take up direction under the action of one of said resilient means, said take up control means including actuator means movable with respect to said members during application of the brakes and including means for moving, during brake application, said housing one seat away from said housing clutch assembly other seat against the biasing action of said second resilient means to advance said first adjusting nut along said screw, whereby on release of said brakes said second resilient means moves said members in a slack take up direction through said first adjusting nut being clutched against rotation with respect to said one member.

8. The brake adjuster set forth in claim 7 wherein said actuator means further comprises:

a control element mounted on said tubular member for shifting movement longitudinally thereof and operably engageable with said movable seat, and means for controlling the movement of said control element relative to said tubular member during the power and release strokes of the rigging for effecting said movement of said housing movable seat, whereby when said element is moved toward said one member sufficiently to move said housing in the same direction against the action of said first resilient means, said first resilient means is effective to move said members in the slack take up through said second adjusting nut being clutched against rotation with respect to said one member until housing stop means engages said tubular member.

9. The brake adjuster set forth in claim 8 wherein:

said first adjusting nut is proportioned to displace said coupling nut from said tubular member clutch seat in the adjuster release position under the action of said second biasing means, said housing stop means separating from said tubular member on application of the brakes to permit said resilient means to rotate said housing and said nuts in the direction of said tubular member when said element is short of operable engagement with said movable seat at the end of the rigging power stroke.

References Cited

UNITED STATES PATENTS

| | | | |
|---|---|---|---|
| 2,767,811 | 10/1956 | Browall et al. | 188—196 |
| 2,908,360 | 10/1959 | Browall | 188—196 |
| 3,326,335 | 6/1967 | Billeter | 188—196 |
| 3,326,336 | 6/1967 | Sobol et al. | 188—196 |

DUANE A. REGER, *Primary Examiner.*

U.S. Cl. X.R.

188—196

PO-1050
(5/69)

UNITED STATES PATENT OFFICE
CERTIFICATE OF CORRECTION

Patent No. 3,448,836              Dated June 10, 1969

Inventor(s)                Gerard Rauglas

It is certified that error appears in the above-identified patent and that said Letters Patent are hereby corrected as shown below:

Column 1, line 12, for "adjusters" read -- adjuster --.
Column 2, line 53, for "FIGUE" read -- FIGURE --.
Column 5, line 3, for "150" read -- 136 --; same column 5, line 4, for "188" read -- 88 --.
Column 6, line 29, delete "86".

SIGNED AND
SEALED
MAY 5 1970

(SEAL)
Attest:

Edward M. Fletcher, Jr.
Attesting Officer

WILLIAM E. SCHUYLER, JR.
Commissioner of Patents